(12) United States Patent
Kuwayama

(10) Patent No.: US 7,515,513 B2
(45) Date of Patent: Apr. 7, 2009

(54) OPTICAL DISC DEVICE

(75) Inventor: Yasunori Kuwayama, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 690 days.

(21) Appl. No.: 11/266,225

(22) Filed: Nov. 4, 2005

(65) Prior Publication Data

US 2006/0098542 A1    May 11, 2006

(30) Foreign Application Priority Data

Nov. 5, 2004 (JP) .............................. 2004-321460

(51) Int. Cl.
*G11B 20/10* (2006.01)
(52) U.S. Cl. ................. 369/47.5; 369/30.16; 369/53.31
(58) Field of Classification Search .............. 369/30.16, 369/47.5, 53.31
See application file for complete search history.

(56) References Cited

U.S. PATENT DOCUMENTS

| 5,274,622 | A | 12/1993 | Kono | |
|---|---|---|---|---|
| 5,721,856 | A * | 2/1998 | Takeuchi | ....................... 711/1 |
| 7,193,943 | B2 * | 3/2007 | Suzuki | .................... 369/47.53 |
| 2002/0044503 | A1 * | 4/2002 | Yoshida | .................... 369/30.16 |
| 2002/0110064 | A1 | 8/2002 | Yen et al. | |
| 2004/0037190 | A1 | 2/2004 | Suzuki et al. | |
| 2005/0068869 | A1 * | 3/2005 | Sugiyama et al. | ........ 369/47.32 |

FOREIGN PATENT DOCUMENTS

| EP | 0 712 130 A1 | 5/1996 |
|---|---|---|
| EP | 1 339 049 A2 | 8/2003 |
| EP | 1 583 082 A1 | 10/2005 |
| JP | 11-353686 | 12/1999 |
| JP | 3534628 | 3/2004 |
| JP | 2004-213725 | 7/2004 |
| JP | 2004-213808 A | 7/2004 |

* cited by examiner

*Primary Examiner*—Wayne R Young
*Assistant Examiner*—Linh T Nguyen
(74) *Attorney, Agent, or Firm*—Crowell & Moring LLP

(57) ABSTRACT

In an optical disc device that records information on a recordable optical disc having a power calibration area (PCA), recording operation is started with an input of a recording command. If an operating environment changes largely along with the recording operation, in order to perform an optimum recording power control, an optical pickup is shifted to the PCA, and the amount of an unused area in the PCA is determined. If an unused area in an amount to perform an optimum power control five times is not left, the optimum recording power control is stopped, and the recording operation is stopped. If left, the optimum recording power control is executed. Then, if a finalizing process is instructed, the finalizing process is performed. This avoids that, when performing a finalizing process of an optical disc after being subjected to recording, the finalizing process cannot be completed because the amount of an unused area remaining in the PCA is small.

3 Claims, 3 Drawing Sheets

OPTICAL DISC DEVICE

BACKGROUND OF THE INVENTION

1. Field of the Invention

The present invention relates to an optical disc device that records information on a recordable optical disc having a power calibration area (PCA) for optimum recording power control.

2. Description of the Related Art

An optical disc for recording such as a DVD (Digital Versatile Disc)-R (Recordable) or a DVD-RW (Rewritable) has a trial recording or writing area (power calibration area which is hereinafter referred to as PCA). An optimum recording power can be detected by performing a trial recording in the PCA with different powers of a laser beam, and then reproducing the recorded data. In a rewritable optical disc such as a DVD-RW, trial writing data in the PCA can be erased. If repetitious optimum recording power control leads to depletion of free space (unused area) for further trial recording, the trial writing data in the PCA can be erased to create free space, preventing the optimum recording power control from being impossible. On the other hand, in a recordable optical disc such as a DVD-R (of the type which cannot erase the recorded data and write new data there), trial writing data recorded in the PCA cannot be erased, and hence the number of available times of optimum recording power control has an upper limit (normally about 100 times).

Since once recorded trial rewriting data cannot be erased in a recordable optical disc as described above, a variety of technologies for effectively utilizing a limited amount of a PCA by reducing the amount of the PCA used for one optimum recording power control are being developed. For example, the following technology is known with regard to a CD-R (Compact Disc-Recordable). That is, without simply changing a laser power during trial writing by 15-stage, the operation of a β value is performed from a reproduction result of a trial writing with an initially set laser power, and the most desirable value is selected from the 15-stage as the next trial writing laser power, so that the amount of a PCA required for one optimum recording power control can be reduced to a large extent (see Japanese Laid-Open Patent Publication No. 11-353686).

Further, the following technology is also known with regard to a CD-R. That is, first, a trial writing is performed with a five-stage laser power based on a recommended recording power and, from their respective reproduction results, a five-stage laser power of a narrower width is set. And then a recording power can be determined finally from a trial writing result with the laser power so set, thereby saving the amount of a PCA required for one optimum recording power control (see Japanese Patent No. 3534628).

As stated above, in recordable optical discs such as a CD-R and a DVD-R, like a recording area, a PCA for optimum recording power control is used up (not rewritable). Therefore, a variety of technologies for saving the amount of a PCA used for one optimum recording power control are being developed in order that a limited PCA enables a larger number of times of an optimum recording power control. In the recordable optical discs, however, the following problem may arise in performing a finalizing process after recording predetermined information.

The term "finalizing process" means a process in which a lead-in and a lead-out that indicate a range of item information of recorded contents and a range of information recording area, and the like are recorded in an optical disc after being subjected to information recording, so that the optical disc can be reproduced with other optical disc device. However, when environmental conditions within an optical disc device are changed, for example, the ambient temperature of an optical pickup reaches or exceeds a predetermined temperature during the execution of a finalizing process, the optical disc device spontaneously performs an optimum recording power control to maintain recording quality. Therefore, if the amount of an unused area remaining in a PCA is small at the time of starting a finalizing process, there may arise such a trouble that the necessary optimum recording power control cannot be performed in the middle of the finalizing process, failing to complete the finalizing process. In this case, this optical disc is not finalized, resulting in such a faulty optical disc that cannot be reproduced with other optical disc device.

In a CD-R, a PCA area for one optimum recording power control during finalizing process is to be reserved (for example, the paragraph "0005" of Japanese Patent No. 3534628). Specifically, a CD-R has a counter area for managing the number of times a PCA is used, and hence an optical disc device can recognize the utilization circumstances of the PCA only by referring to the counter area. This permits reservation of an area required for performing just one optimum recording power control, so that the above-mentioned disadvantage can be avoided relatively easily. On the other hand, in a DVD-R, there is no counter area for indicating the number of times a PCA is used, and only a head address of trial writing data written in the PCA is recorded. It is therefore not easy to accurately recognize the amount of an unused area remaining in the PCA at a proper time, making it difficult to prevent occurrence of the above-mentioned trouble. Furthermore, the DVD-R has more process items during finalizing process (information that should be recorded additionally in an optical disc) than the CD-R, and the shift amount of an optical pickup extends to a wide range of the optical disk. As a result, the amount of the PCA required for optimum recording power control during finalizing process is indefinite, in this respect, (even though the DVD-R can manage the number of times the PCA is used by means of the same counter area as in the CD-R), it is difficult to prevent occurrence of the above-mentioned trouble.

SUMMARY OF THE INVENTION

For these circumstances, an object of the present invention is to provide an optical disc device that records information in a recordable optical disc having a PCA, which is free from such a trouble that, when a user selects to perform a finalizing process of an optical disk after being subjected to recording, even though once the finalizing process is started, the finalizing process is discontinued en route due to a small unused area remaining in the PCA of the optical disc, resulting in a faulty optical disc; or that, even though a user desires to perform a finalizing process of the optical disc, it cannot be executed because little unused area of the PCA of the optical disc is left.

In an aspect of the present invention, an optical disc device that records information on a recordable optical disc having a power calibration area (PCA) for optimum recording power control comprises: forced optimum recording power control means that, if inputted a finalize instruction command under which a finalizing process of an optical disc is performed, causes execution of an optimum recording power control prior to the finalizing process; autonomous optimum recording power control means that causes, during recording, the optical disc device to monitor an operating environment of the optical disc device such as an increase of an ambient temperature of an optical pickup, and to execute an optimum recording power control based on an operating environment change, the control means automatically performing an optimum recording power control when a user inputs an instruction of a finalizing process, and when the optical disc device detects by itself an operating environment change of the optical disc device; power calibration enable area detecting means that detects, before the autonomous optimum recording power control means performs an optimum recording power control, whether an unused area remaining in the power calibration area is not less than an amount of a power calibration area which is used during finalizing process; optimum recording power control operation stopping means that stops an optimum recording power control when a result of detection by the power calibration enable area detecting means indicates that an unused area remaining in a power calibration area is less than the above-mentioned amount; and finalize-time optimum recording power control means that causes the power calibration enable area detecting means and the optimum recording power control operation stopping means to be inoperable after the forced optimum recording power control means executes an optimum recording power control, wherein no optimum recording power control is executed when a result of detection by the power calibration enable area detecting means indicates that an unused area remaining in the power calibration area is less than the above-mentioned amount during recording, and an unused area in an amount required for a finalizing process is left in a power calibration area during finalizing process.

According to the present invention, in an optical disc device that records information in a recordable optical disc having a PCA for optimum recording power control, the optical disc device is free from such a trouble that, when a user selects to perform a finalizing process of an optical disk after being subjected to recording, even though once the finalizing process is started, the finalizing process is discontinued en route due to a small unused area remaining in the PCA of the optical disc, resulting in a faulty optical disc; or that, even though a user desires to perform a finalizing process of the optical disc, it cannot be executed because little unused area of the PCA of the optical disc is left. This permits at all times a satisfactory finalizing process of an optical disc after being subjected to a predetermined recording.

DESCRIPTION OF THE PREFERRED EMBODIMENTS

Preferred embodiments of the present invention, as best mode for carrying out the invention, will be described below with reference to the accompanying drawings. The following description exemplifies a case where the present invention is applied to such a DVD (Digital Versatile Disc) recorder, with a DVD-R (Recordable) mounted thereon as a recordable optical disc having a power calibration area (PCA), that can record various information such as video information on the DVD-R, and can reproduce information recorded on the DVD-R.

Figure 1:
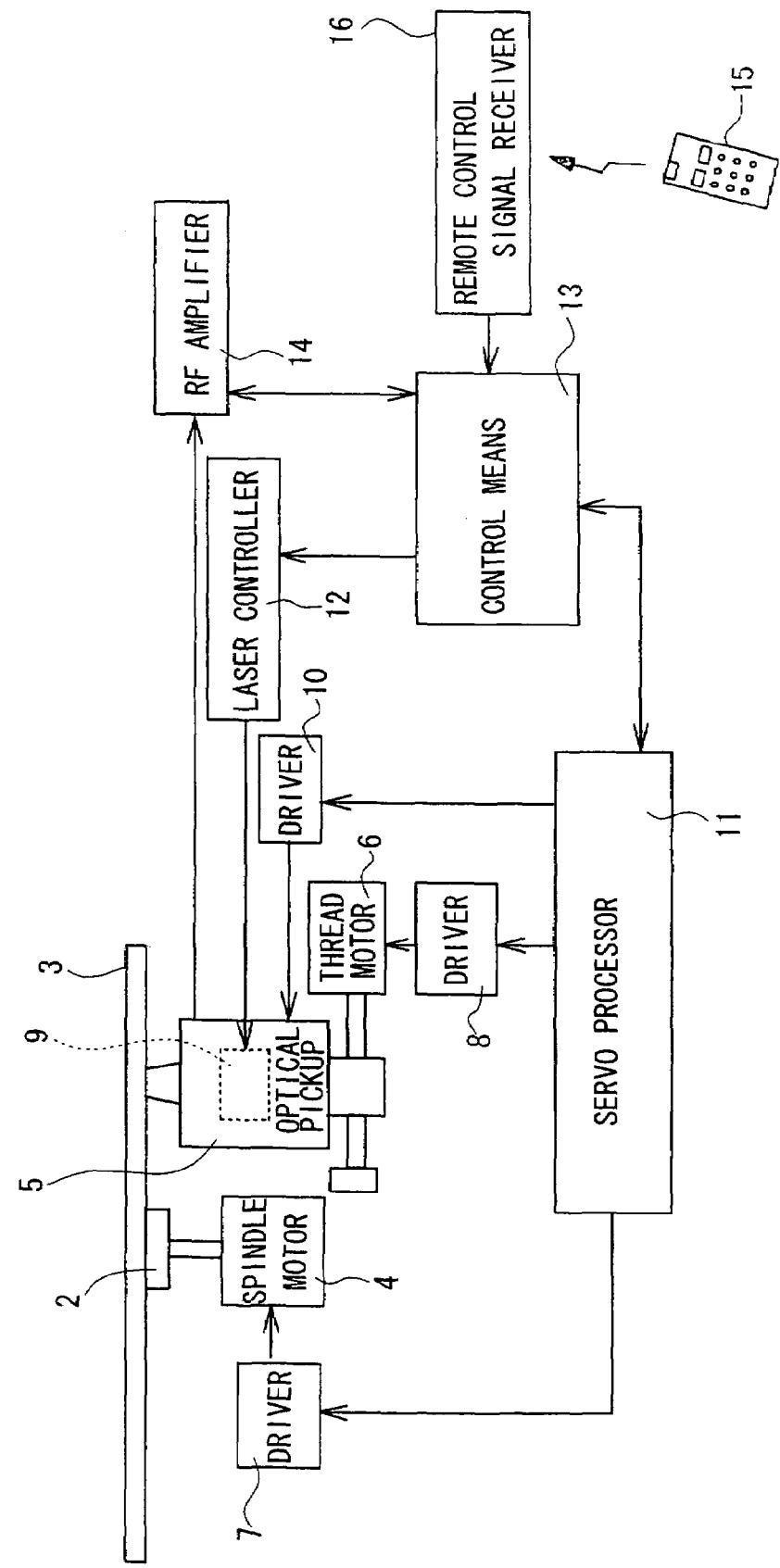
FIG. 1 is an electrical block diagram of a DVD recorder according to one preferred embodiment of the invention.

FIG. 1 is an electrical block diagram of a DVD recorder 1 according to this embodiment. The DVD recorder 1 comprises: a spindle motor 4 that rotatably drives an optical disc 3 mounted on a turntable 2; a thread motor 6 that shifts an optical pickup 5 in a radial direction of the optical disc 3; and drivers 7 and 8 that drive the motors 4 and 6, respectively. The optical pickup 5 includes a focusing actuator (not shown) and a tracking actuator (not shown), which focus a laser beam emitted from a semiconductor laser beam source 9 on a predetermined track on the optical disc 3, and further includes a driver 10 that drives these actuators. The drivers 7, 8, and 10 are respectively connected to a servo processor 11.

The semiconductor laser beam source 9 is arranged such that its laser beam intensity (laser power) can be adjusted to increase or decrease via a laser controller 12 by control means 13 composed of a microcomputer. The control means 13 controls the servo processor 11. And, an RF signal outputted from the optical pickup 5 is inputted via an RF (Radio Frequency) amplifier 14 to the control means 13. Additionally, a remote control signal receiver 16 that receives an infrared signal from a remote control 15 is connected to the control means 13. When a user operates the remote control 15 to input instructions such as "record," "reproduce," and "finalizing process," the control means 13 sends a control signal to the servo processor 11 and the laser controller 12 to have them execute operations corresponding to their respective commands. Specifically, for example, when the user inputs "record," the control means 13 drives via the servo processor 11 the focusing actuator and the tracking actuator so as to focus a laser beam on a desired track on the optical disc 3, and also drives the thread motor 6 to shift the optical pickup 5 from an inner circumference side of the optical disc 3 to an outer circumference side and, at the same time, controls via the laser controller 12 a laser beam irradiated from the laser beam source 9, thereby forming a pit of a digital signal on the optical disc 3.

Referring now to the flow chart of FIG. 2, a description will be made of a procedure the control means 13 executes when a user inputs a "record" command with the optical disc 3 mounted. Upon the detection of an input of a record command (YES in step S1), the control means 13 sends a signal to the servo processor 11 to start the above-mentioned record operation (S2). Along with this recording operation, an operating environment changes, for example, the ambient temperature of the optical pickup 5 increases, and the radial position of the optical pickup 5 with respect to the optical disc 3 is displaced. Consequently, when the control means 13 detects that the magnitude of such an operating environment change exceeds a predetermined value (YES in S3), in order to perform an optimum recording power control (OPC), the control means 13 causes the optical pickup 5 to be seek-shifted to a PCA (on the innermost circumferential side of the optical disc 3), and to detecting there as to whether there is an unused area remaining in the PCA required for performing the optimum recording power control five times (S4).

Here, operating environment changes that can trigger the optimum recording power control will be described. That is, when the optical disc device 1 is operated, various environments within the optical disc device (e.g., the ambient temperature of the optical pickup 5, the radial position of the optical pickup 5 with respect to the optical disc 3, and the like) are changed. When the magnitude of such a change exceeds a predetermined value, the recording characteristic of a laser beam with respect to the optical disc 3 (namely, pit formation) deteriorates. To avoid this deterioration, a voltage applied to the semiconductor laser beam source 9, and the like are changed. In the above example, when the ambient temperature of the optical pickup 5 increases by five degree Celsius, the characteristic of the semiconductor laser beam source 9 changes largely, and hence this change should be controlled. When the radial position of the optical pickup 5 with respect to the optical disc 3 has a predetermined value or above, the optical disc 3 has different radial characteristics (index of reflection, and the like). To compensate for this, the laser power should be controlled. It is a known technology to detect these operating environment changes and perform a spontaneous optimum recording power control. The spontaneous optimum recording power control is hereinafter referred to as autonomous optimum recording power control (autonomous OPC).

Figure 4:
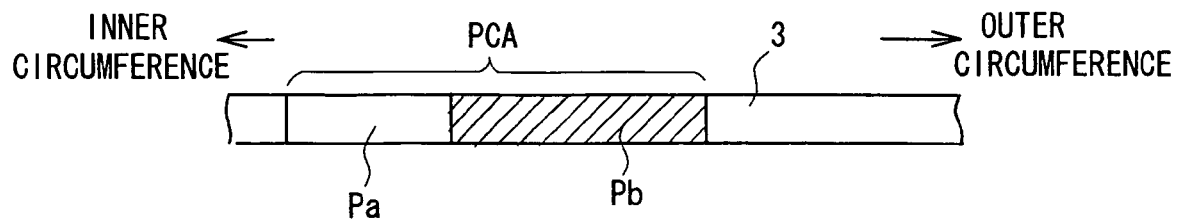
FIG. 4 is a diagram showing schematically a power calibration area of an optical disc (DVD-R).

Referring to FIG. 4, a description will be made of the process of detecting, in step S4, whether there is still the amount of an unused area remaining in a PCA required for performing an optimum recording power control (OPC) five times. The PCA is formed on the innermost circumference of the optical disc 3. In a DVD-R, trial writing data is recorded starting from the outer circumferential side of the PCA. Normally, the PCA has space secured or reserved therein, allowing the OPC to be performed about 100 times. FIG. 4 shows a state in which about 60% of a PCA is already used, leaving about 40% as free space of the PCA (an unused area Pa that enables the OPC to be performed 40 times).

The optical pickup 5, which is being seek-shifted to the PCA, irradiates a laser beam onto the surface of the optical disc 3, while being seek-shifted from the innermost circumferential position of the PCA to its outer circumference, as shown in FIG. 4. The reflected light is used to discriminate and detect an area (unused area) Pa in the PCA where no data is written, and an area Pb where data is already written. In this preferred embodiment, detection is made on whether a free space (unused area) Pa remains in an amount to perform the OPC five times. This means to determine whether a 5% area of the entire PCA remains as the free space Pa. Note that the amount of the free space Pa remaining should not be limited to an amount to perform the OPC five times, and any number of times can be set suitably. The reason why five times is preferable for this preferred embodiment will be described later.

If the result of step S4 is NO (namely, if the unused area Pa remaining in the PCA is less than an amount to perform the OPC five times), an autonomous optimum recording power control (autonomous OPC) is discontinued on the moment (S5). This processing serves as optimum recording power control operation stopping means in Claim. And, recording operation is also discontinued because it is impossible to maintain excellent recording quality (S6). This processing serves as recording operation stopping means in Claim. If the result of step S4 is YES (namely, if there is still the unused area Pa remaining in the PCA required for performing the OPC five times), trial writing data is recorded on the unused area Pa, and an autonomous OPC is executed (S7). Upon the completion of the autonomous OPC, determination is made on whether a user has inputted a recording end command (S8). If not yet inputted (NO in S8), recording continues, and monitoring of any operating environment change is restarted (S3). If the recording end command is inputted (YES in S8), recording is ended (S9), and determination is made on whether a user has inputted an instruction command of a finalizing process (S10).

Figure 3:
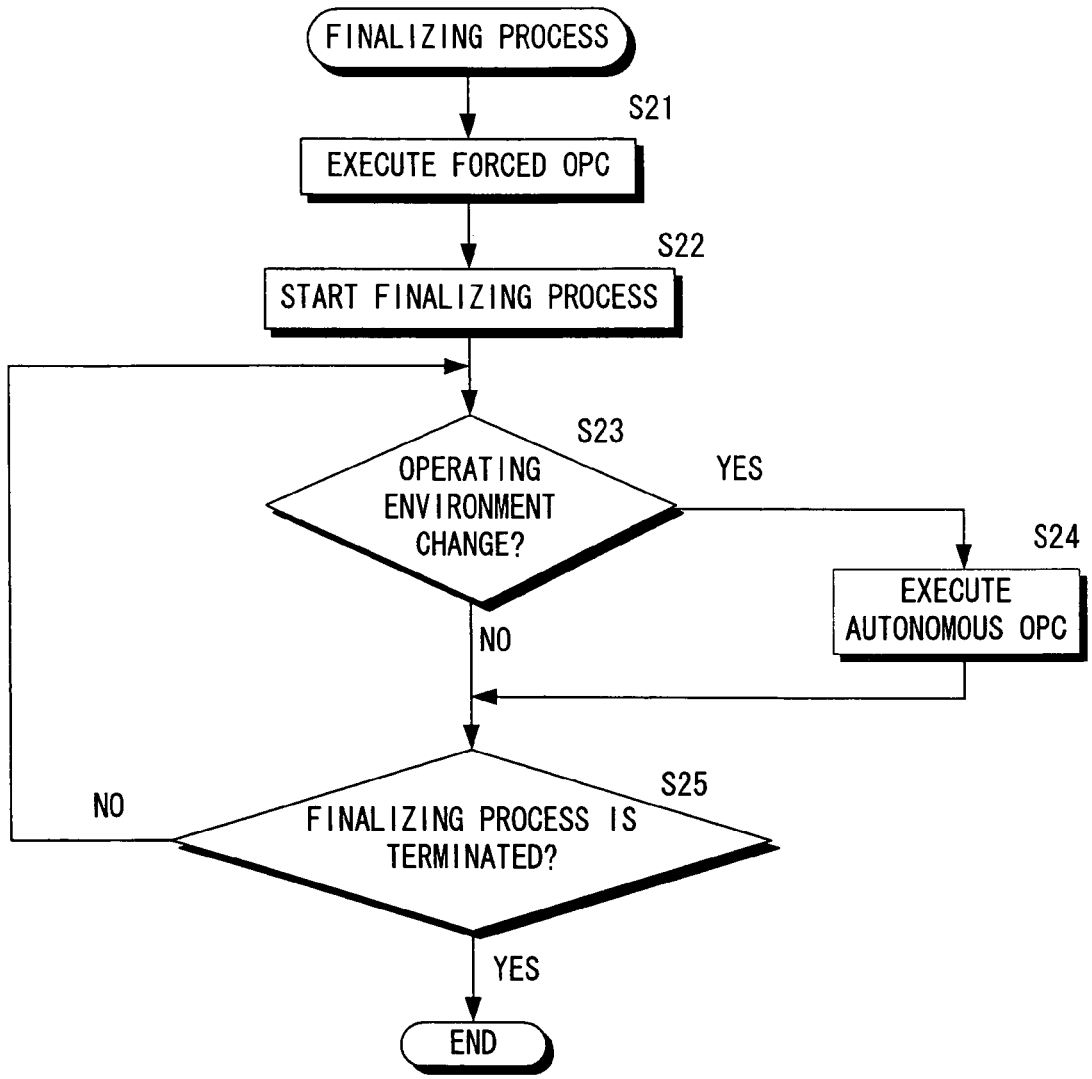
FIG. 3 is a flow chart during finalizing process in the DVD recorder.

Unless the instruction command of a finalizing process is inputted at the time (NO in S10), the process of the optical disc 3 ends temporarily. If the instruction command of a finalizing process is being inputted (YES in S10), a sequence of finalizing process is executed (S11). The finalizing process will be described with reference to the flow chart of FIG. 3.

When the finalizing process is started, in order to maintain the recording quality during finalizing process, the control means 13 first causes the optical pickup 5 to be seek-shifted to the PCA, thereby performing the OPC (S21). In the following, the OPC prior to the finalizing process is referred to as forced optimum recording power control (forced OPC). The process during the recording onto the optical disc 3 is as shown in the flow chart of FIG. 2, and its contents are as stated above. Accordingly, an unused area Pa in the PCA equivalent to an amount to perform the OPC at least five times can be reserved at the time of the forced OPC.

After the forced OPC is executed to control a laser power to be an optimum recording power, the substantial finalizing process is started (S22). Specifically, this process includes the followings: recording of a lead-in area indicating an inner circumference of a recording area; recording of dummy data onto an outside of data stored in the recording area; recording of a lead-out area onto an outer circumference of the dummy data; and recording of various items (titles, addresses, and the like) that indicate recording contents. Also, when performing these various recordings for the finalizing process, the optical pickup 5 might largely move in a radial direction of the optical disc 3, and the ambient temperature of the optical pickup 5 might increase. These operating environment changes can be monitored in the same manner as in recording. If a change exceeding a predetermined magnitude occurs, for example, if the ambient temperature of the optical pickup 5 increases by five degree Celsius or above (YES in S23), the above-mentioned autonomous OPC is executed (S24). Unlike the autonomous OPC during recording, the autonomous OPC during finalizing process is executed without detecting whether an unused area Pa in the PCA remains in an amount to perform the OPC five times. This is because the unused area Pa in the PCA is reserved in an amount to perform the OPC at least five times when the procedure advances to the finalizing process as described above; and because it is determined that no other process is performed after advancing to the finalizing process. In other words, the autonomous OPC during the finalizing process is executed without previously determining the amount of an unused area Pa in the PCA. When the substantial finalizing process is terminated (YES in S25), all the processes of the optical disc 3 are completed, so that the optical dick 3 is in a ready condition for reproduction whenever it is mounted on other optical disc device.

The following is the reason why the amount of an unused area Pa in the PCA prior to the autonomous OPC is determined by using an amount to perform the OPC five times as reference. The execution of the autonomous OPC can be triggered by such an environmental change that the ambient temperature of the optical pickup 5 increases by five degree Celsius or above; or that the optical pickup 5 has a predetermined amount of radial shift with respect to the optical disc 3, and the like as above described. It is a matter of experience that such an environmental change necessitating the OPC during the finalizing process will usually occur about five times. Therefore, when the magnitude reference of environmental changes that trigger the autonomous OPC is set to a smaller value in order to maintain recording quality at a higher level (for example, when the autonomous OPC is performed every time the ambient temperature of the optical pickup 5 increases by three degree Celsius), the number of times the autonomous OPC occurs during the finalizing process is increased. Hence, in step S4 in the procedure during recording, an unused area Pa in the PCA is not determined by using an amount to perform the OPC five times as reference, but it is preferable to change to a suitable value greater than that. However, when the magnitude reference of environmental changes which trigger the autonomous OPC is set to a smaller value as described above, the frequency of use of the PCA increases. This increases the possibility of recording stop due to exhaustion of an unused area in the PCA during normal recording. Consequently, when the magnitude reference of environmental changes that trigger the autonomous OPC is set to an optimum magnitude in the present state, an average number of times of the OPC to be caused during the finalizing process is ultimately about five times.

In any case, with the DVD recorder 1 of this preferred embodiment, at every time of the autonomous OPC to be executed when the magnitude of an operating environment change exceeds a predetermined value during recording onto the optical disc 3 (DVD-R), the amount of an unused area Pa in the PCA is detected to determine whether the amount is equivalent to an amount to perform the OPC five times. This ensures that an unused area in the PCA equivalent to an amount to perform the OPC five times is reliably reserved at the moment of the transition from a recording process to a finalizing process. Therefore, the DVD recorder 1 is free from such a trouble that, when the finalizing process is started with a small unused area Pa remaining in the PCA, the finalizing process is interrupted en route, or such a trouble that an unused area Pa is hardly left in the PCA at the time of the transition to a finalizing process, making it impossible to start the finalizing process. Additionally, it is free from such a trouble that an unused area Pa in the PCA is exhausted during the finalizing process, failing to complete the finalizing process, because the amount of an unused area Pa reserved in the PCA is set to such an amount as to be capable of covering the number of times of the autonomous OPC that normally occurs during the finalizing process.

Figure 2:
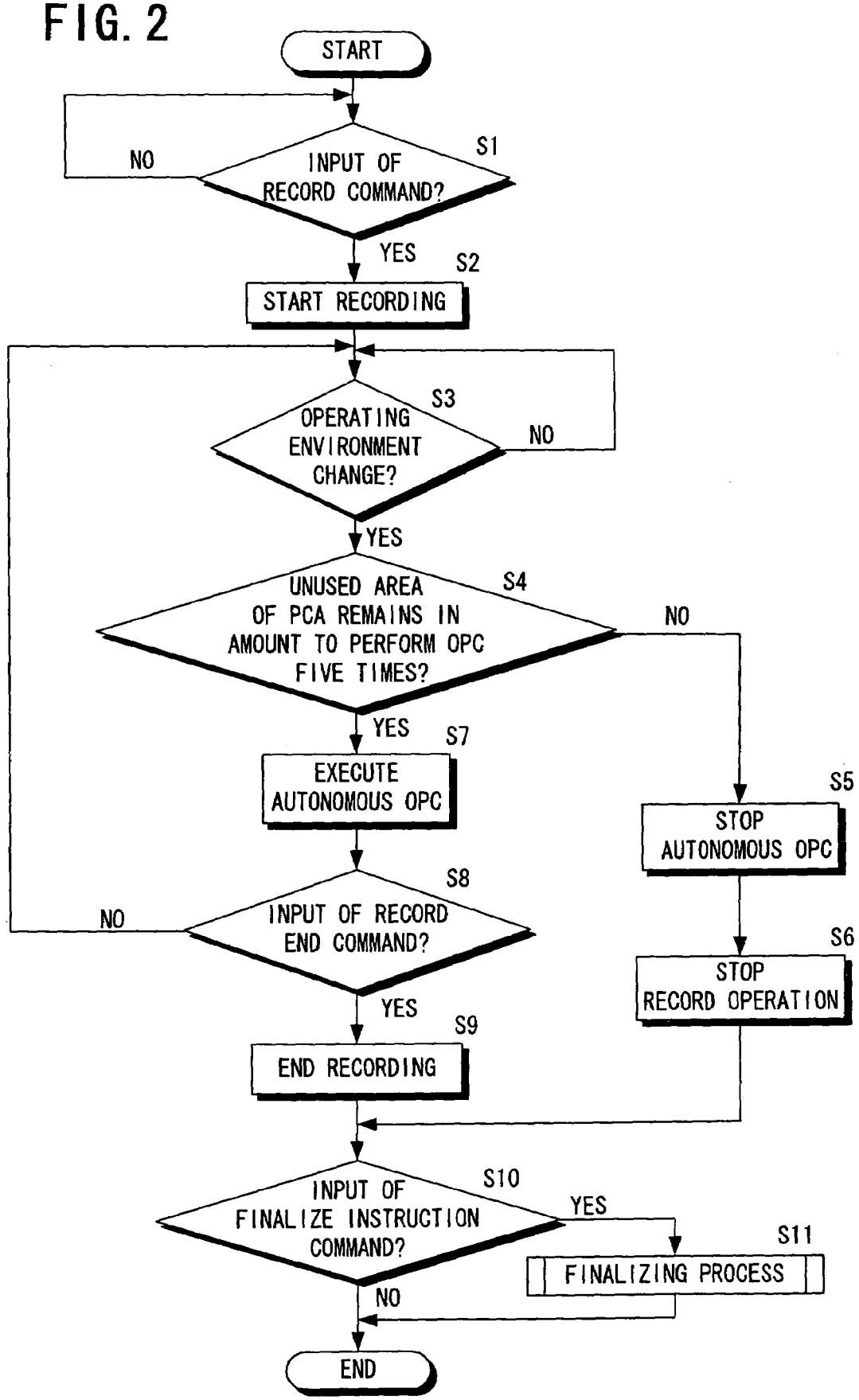
FIG. 2 is a flow chart during recording in the DVD recorder.

In the procedure during recording as shown in the flow chart of FIG. 2, by configuring such that, after the recording operation is stopped in step S6, a message stating that recording is stopped because recording quality cannot be maintained is displayed on a display part (not shown), which is equipped with the optical disc device 1, a user can be aware of the reason why the recording operation is stopped independently of the user's instruction.

This application is based on Japanese patent application 2004-321460 filed Nov. 5, 2004, the contents of which are hereby incorporated by reference.

What is claimed is:

1. An optical disc device that records information on a recordable optical disc having a power calibration area (PCA) for optimum recording power control, comprising:
   forced optimum recording power control means that, if inputted a finalize instruction command under which a finalizing process of an optical disc is performed, causes execution of an optimum recording power control prior to the finalizing process;
   autonomous optimum recording power control means that causes, during recording, the optical disc device to monitor an operating environment of the optical disc device such as an increase of an ambient temperature of an optical pickup, and to execute an optimum recording power control based on an operating environment change, the control means automatically performing an optimum recording power control when a user inputs an instruction of a finalizing process, and when the optical disc device detects by itself an operating environment change of the optical disc device;
   power calibration enable area detecting means that detects, before the autonomous optimum recording power control means performs an optimum recording power control, whether an unused area remaining in the power calibration area is not less than an amount of a power calibration area which is used during finalizing process;
   optimum recording power control operation stopping means that stops an optimum recording power control when a result of detection by the power calibration enable area detecting means indicates that an unused area remaining in a power calibration area is less than the above-mentioned amount; and
   finalize-time optimum recording power control means that causes the power calibration enable area detecting means and the optimum recording power control operation stopping means to be inoperable after the forced optimum recording power control means executes an optimum recording power control,
   wherein no optimum recording power control is executed when a result of detection by the power calibration enable area detecting means indicates that an unused area remaining in the power calibration area is less than the above-mentioned amount during recording, and an unused area amount required for a finalizing process is left in a power calibration area during finalizing process.

2. The optical disc device according to claim 1, wherein the amount of an unused area in a power calibration area which is used during finalizing process is an amount enabling a power calibration operation for optimum recording power control to be performed about five times.

3. An optical disc device that records information on a DVD-R (Recordable) or a DVD+R (Recordable) of a recordable optical disc having a power calibration area (PCA) for optimum recording power control, comprising:
   forced optimum recording power control means that, if inputted a finalize instruction command under which a finalizing process of an optical disc is performed, causes execution of an optimum recording power control prior to the finalizing process;
   autonomous optimum recording power control means that causes, during recording, the optical disc device to monitor an operating environment of the optical disc device such as an increase of an ambient temperature of an optical pickup, and to execute an optimum recording power control based on an operating environment change, the control means automatically performing an optimum recording power control when a user inputs an instruction of a finalizing process, and when the optical disc device detects by itself an operating environment change of the optical disc device;
   power calibration enable area detecting means that detects, before the autonomous optimum recording power control means performs an optimum recording power control, whether an unused area remaining in the power calibration area is not less than an amount to perform a power calibration operation for performing optimum recording power control about five times;
   optimum recording power control operation stopping means that stops an optimum recording power control when a result of detection by the power calibration enable area detecting means indicates that an unused area remaining in a power calibration area is less than an amount to perform a power calibration operation for optimum recording power control about five times;
   recording operation stopping means that stops recording operation when a result of detection by the power calibration enable area detecting means indicates that an unused area remaining in a power calibration area is less than an amount to perform a power calibration operation for performing optimum recording power control about five times; and finalize-time optimum recording power control means that causes the power calibration enable area detecting means and the optimum recording power control operation stopping means and the recording operation stopping means to be inoperable after the forced optimum recording power control means executes an optimum recording power control, wherein no optimum recording power control is executed when a result of detection by the power calibration enable area detecting means indicates that an unused area remaining in the power calibration area is less than the above-mentioned amount during recording, and an unused area amount required for performing an optimum recording power control about five times is left in a power calibration area during finalizing process.

* * * * *